US011116033B2

(12) United States Patent
Law

(10) Patent No.: US 11,116,033 B2
(45) Date of Patent: Sep. 7, 2021

(54) METHOD AND APPARATUS FOR DISASSOCIATING FROM A NETWORK

(71) Applicant: MOTOROLA SOLUTIONS, INC, Chicago, IL (US)

(72) Inventor: Swee Hak Law, Bukit Mertajam (MY)

(73) Assignee: MOTOROLA SOLUTIONS, INC., Chicago, IL (US)

(*) Notice: Subject to any disclaimer, the term of this patent is extended or adjusted under 35 U.S.C. 154(b) by 61 days.

(21) Appl. No.: 16/314,871

(22) PCT Filed: Jul. 11, 2016

(86) PCT No.: PCT/MY2016/000040
§ 371 (c)(1),
(2) Date: Jan. 3, 2019

(87) PCT Pub. No.: WO2018/012957
PCT Pub. Date: Jan. 18, 2018

(65) Prior Publication Data
US 2019/0246450 A1 Aug. 8, 2019

(51) Int. Cl.
*H04B 7/00* (2006.01)
*H04W 76/30* (2018.01)
*H04W 84/18* (2009.01)
*H04W 60/06* (2009.01)
*H04W 8/00* (2009.01)
*H04W 48/18* (2009.01)

(52) U.S. Cl.
CPC ........... *H04W 76/30* (2018.02); *H04W 8/005* (2013.01); *H04W 60/06* (2013.01); *H04W 84/18* (2013.01); *H04W 48/18* (2013.01)

(58) Field of Classification Search
CPC .... H04W 76/30; H04W 84/18; H04B 1/3883; H04B 1/3877
USPC .................................................. 455/41.2, 573
See application file for complete search history.

(56) References Cited

U.S. PATENT DOCUMENTS

| 4,757,553 A * | 7/1988 | Crimmins | H04M 1/737 379/56.3 |
| 6,526,294 B1 * | 2/2003 | Banh | H02J 7/0031 320/112 |
| 7,542,721 B1 * | 6/2009 | Bonner | G08B 25/004 340/539.1 |
| 8,666,313 B2 * | 3/2014 | Preston | H04W 8/005 455/41.1 |

(Continued)

FOREIGN PATENT DOCUMENTS

| EP | 2257035 A1 | 12/2010 | |
| WO | 2016036309 A1 | 3/2016 | |
| WO | WO-2016036309 A1 * | 3/2016 | ............ H02J 7/0044 |

OTHER PUBLICATIONS

The International Search Report and the Written Opinion corresponding serial No. PCT/MY2016/000040 filed Jul. 11, 2016, all pages.

*Primary Examiner* — April G Gonzales

(57) ABSTRACT

A method and apparatus for quickly disassociating/unpairing a device from a PAN is describe herein. During operation a charger identification is utilized as a trigger to disassociate/unpair a device from a PAN. Thus, a device will sense proximity to a charging device. Once proximity to a particular charging device is detected, the device will disassociate/unpair from the PAN.

10 Claims, 4 Drawing Sheets

(56) References Cited

U.S. PATENT DOCUMENTS

| | | | |
|---|---|---|---|
| 8,862,921 B1* | 10/2014 | Kim | G06F 1/32 713/323 |
| 9,301,087 B1* | 3/2016 | Pappas | H04W 8/005 |
| 9,402,120 B2* | 7/2016 | Linden | H04R 1/10 |
| 9,426,606 B2* | 8/2016 | Lee | H04W 4/80 |
| 9,504,072 B2* | 11/2016 | Widner | H04B 1/3883 |
| 9,883,330 B2* | 1/2018 | Nair | H04W 76/14 |
| 10,182,329 B1* | 1/2019 | Roths | H04W 4/70 |
| 10,784,722 B2* | 9/2020 | Lai | H04R 1/1025 |
| 2002/0123345 A1* | 9/2002 | Mahany | H04W 56/002 455/432.1 |
| 2003/0061364 A1* | 3/2003 | Banerjee | H04L 12/1485 709/229 |
| 2003/0236091 A1* | 12/2003 | Wonak | H04W 88/18 455/426.2 |
| 2005/0086273 A1* | 4/2005 | Loebbert | H04W 12/069 |
| 2005/0131996 A1* | 6/2005 | Mastrianni | H04L 67/1095 709/203 |
| 2006/0217162 A1* | 9/2006 | Bodley | H04R 1/406 455/575.1 |
| 2007/0076672 A1* | 4/2007 | Gautier | H04W 84/20 370/338 |
| 2009/0251300 A1* | 10/2009 | Yasuda | B60L 53/65 340/426.1 |
| 2010/0081411 A1* | 4/2010 | Montenero | G08B 21/0233 455/404.2 |
| 2010/0245585 A1* | 9/2010 | Fisher | H04M 1/0266 348/164 |
| 2010/0302980 A1* | 12/2010 | Ji | H04W 52/0261 370/311 |
| 2011/0028091 A1* | 2/2011 | Higgins | H04L 63/18 455/41.2 |
| 2012/0181978 A1* | 7/2012 | Okuyama | H02J 7/00047 320/107 |
| 2013/0257364 A1* | 10/2013 | Redding | H02J 7/0071 320/108 |
| 2013/0269013 A1* | 10/2013 | Parry | H04L 63/107 726/7 |
| 2013/0288600 A1* | 10/2013 | Kuusilinna | H02J 7/00036 455/41.2 |
| 2013/0295848 A1* | 11/2013 | O'Neill | H04W 68/00 455/41.2 |
| 2014/0024404 A1* | 1/2014 | Lim | H04L 69/14 455/509 |
| 2014/0036863 A1* | 2/2014 | Lim | H04W 36/06 370/330 |
| 2014/0068116 A1* | 3/2014 | Kim | H04W 52/0225 710/33 |
| 2014/0150100 A1* | 5/2014 | Gupta | G06F 21/316 726/22 |
| 2014/0211648 A1* | 7/2014 | Rahmati | H04W 48/12 370/252 |
| 2014/0247004 A1* | 9/2014 | Kari | H02J 7/025 320/106 |
| 2014/0269425 A1* | 9/2014 | Fisher | H04L 12/66 370/254 |
| 2015/0023204 A1* | 1/2015 | Wik | H02J 50/10 370/254 |
| 2015/0289298 A1* | 10/2015 | Widner | H04L 41/0813 455/41.2 |
| 2016/0062992 A1* | 3/2016 | Chen | H04L 9/3231 707/736 |
| 2016/0065908 A1* | 3/2016 | Chang | G06F 21/79 348/158 |
| 2016/0066085 A1* | 3/2016 | Chang | G06F 21/79 381/122 |
| 2016/0073188 A1* | 3/2016 | Linden | H04R 1/1025 381/309 |
| 2016/0073189 A1* | 3/2016 | Linden | H04R 1/1025 381/74 |
| 2016/0073349 A1* | 3/2016 | Mohan | H04W 76/14 455/426.1 |
| 2016/0117268 A1* | 4/2016 | Griffin | G06F 13/102 710/10 |
| 2016/0226280 A1* | 8/2016 | Noor | G01R 31/3648 |
| 2016/0254684 A1* | 9/2016 | Gothoskar | H02J 7/0027 455/572 |
| 2017/0013369 A1* | 1/2017 | Renken | H04R 25/30 |
| 2017/0059413 A1* | 3/2017 | Honjo | H04B 1/40 |
| 2017/0064487 A1* | 3/2017 | Buckley | H04W 60/02 |
| 2018/0246552 A1* | 8/2018 | Thompson | G06F 11/3093 |

\* cited by examiner

METHOD AND APPARATUS FOR DISASSOCIATING FROM A NETWORK

RELATED APPLICATIONS

The present invention is related to co-pending patent application Ser. No. 15/535,465, entitled Method and Apparatus for Forming a Network, and filed on the same day as the present application.

FIELD OF THE INVENTION

The present invention generally relates to disassociating from a network, and more particularly to a method and apparatus for disassociating from a network based upon the detection of battery charger identification.

BACKGROUND OF THE INVENTION

Next-generation public safety officers will be equipped with sensors (devices) that determine various physical and environmental conditions surrounding the public-safety officer. These conditions are generally reported back to a dispatch operator so that an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer of the future will have an array of shelved devices available to the officer at the beginning of a shift. The officer will select the devices off the shelf, and form a personal area network (PAN) with the devices that will accompany the officer on their shift. For example, the officer may pull a gun-draw sensor, a body-worn camera, a police radio, a man-down sensor, . . . , etc. All devices pulled by the officer will be configured to form a PAN by associating (pairing) with each other and communicating wirelessly among the devices.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

Thus, pairing and unpairing typically involves some level of user interaction. This user interaction is the basis for confirming the identity of devices. Once pairing successfully completes, a bond will have been formed between the two devices, enabling those two devices to connect to each other in the future without again requiring the pairing process. When desired, the bonding relationship can later be removed by the user.

Because devices are pulled randomly at the beginning of a shift, an officer may pull a different array of devices every time they form a PAN. This requires that old bonds be cleared from every device at the end of a shift, and new be formed every time the officer pulls devices at the beginning of their shift.

A problem with the above-described scenario is that forming a PAN at the beginning of a shift from the pulled devices, as well as un-forming the PAN at the end of the shift from the pulled devices can take a considerable amount time for the officer. For example, a public-safety officer will need to access each device and "associate/pair" the device to the PAN at the beginning of their shift. In a similar manner, the public-safety officer will need to access each device and "disassociate/unpair" the device from the PAN at the end of their shift. This will take a considerable amount of time and effort. Considering this fact, there exists a need for a method and apparatus for quickly disassociating a device from a PAN.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
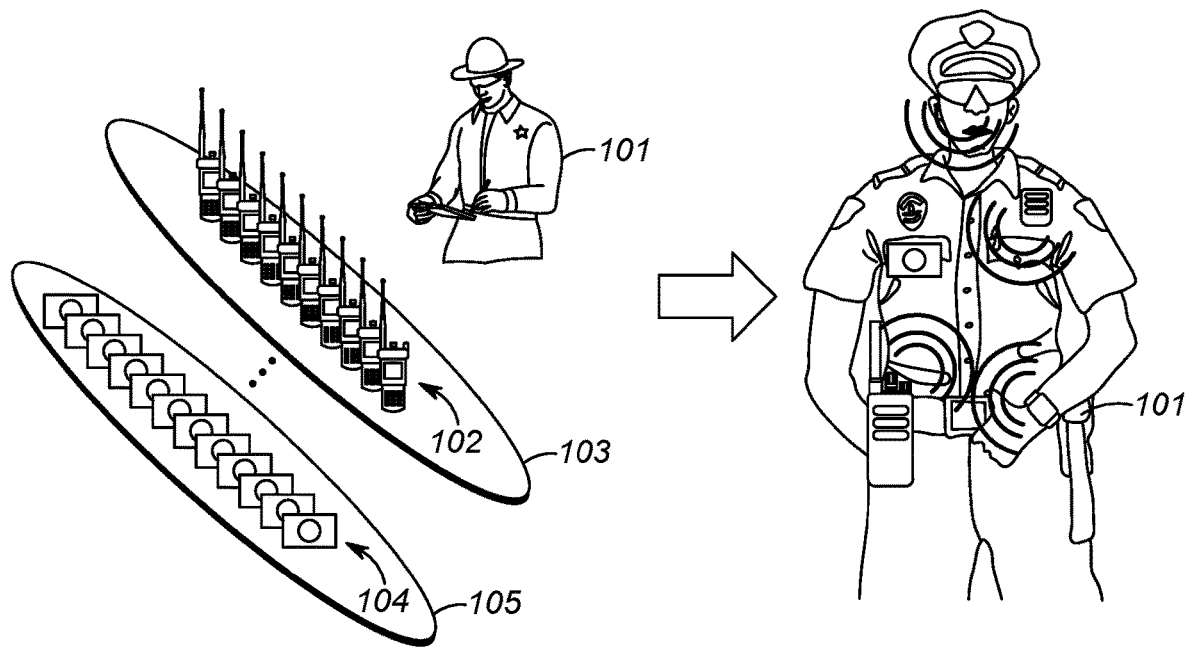
FIG. 1 illustrates an operational environment for the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for quickly disassociating/unpairing a device from a PAN is describe herein. During operation a charger identification is utilized as a trigger to disassociate/unpair a device from a PAN. Thus, a device will sense proximity to a particular charging device. Once proximity to the particular charging device is detected, the device will disassociate/unpair from the PAN.

It should be noted that the terms disassociate and unpair can be used interchangeably, and simply mean that a device is dropped from the PAN. All bonds may be eliminated as well during this process. When disassociated from the PAN, data communications between any device left on the PAN and the disassociated device cease to exist since. This may involve dropping some or all data links between the PAN and the disassociated device.

Elaborating a bit more on the above, when not in use, it is assumed devices will be stored on a charger. This fact can be leveraged to aide in quickly disassociating a device from a PAN. More particularly, a charger identification (ID) can be used to trigger disassociating a device from a PAN, such that when the officer arrives back at the station after work. Placing a device on a particular charger will automatically cause the device to disassociate from the PAN without any input from the officer. This will greatly simplify the officer's work when they arrive at the station after their shift.

It should be noted that in a particular embodiment, simply placing the device on any charger is not enough to cause a device to disassociate from a PAN. The device will need to be placed on/in a particular charger(s) in order for disassociation to take place. For example, a device may be charged in the field (for example within the officer's automobile) without the device automatically disassociating from the PAN. However, when the same device is charged at the police station, the device will be disassociated from any PAN. It should also be noted that more than one charger ID may cause disassociation from the PAN, so that any number of chargers may be utilized by the officer after their shift.

The PAN described above that is formed between devices preferably comprises a wireless PAN that comprises a low-powered PAN carried over a short-distance wireless network technology such as PANs formed using the following standards: INSTEON, IrDA, Wireless USB, Bluetooth, Z-Wave, ZigBee, and Body Area Network. The reach of a wireless PAN varies from a few centimeters to a few meters. Associating/pairing and disassociating/unpairing a device from the PAN is well known in the art, and takes place as described by any of the above standards.

As one of ordinary skill in the art will recognize, during the formation of a Bluetooth PAN there is typically one master device (hub) and one or more slave devices. The number of slave devices is limited by the capability of the master device. All communication within a PAN is between the master and slave devices. There is no direct communication between the slave devices over a PAN, although these devices may have separate Bluetooth connections between them not using the PAN.

After a PAN is established, the slave devices are synchronized to the timing and frequencies specified by the master device (hub). Note that in a PAN, each slave device uses a different physical channel. Thus, a PAN starts with two connected devices, and may grow to any number of connected devices (although in some systems eight is the maximum number of devices within a Bluetooth PAN). Bluetooth communication always designates one of the Bluetooth devices as a main controlling unit or master unit. Other devices that follow the master unit are slave units. This allows the Bluetooth system to be non-contention based (no collisions). This means that after a Bluetooth device has been added to the PAN, each device is assigned a specific time period to transmit and they do not collide or overlap with other units operating within the same PAN.

FIG. 1 depicts a general operating environment for the above-described technique for disassociating a device from a PAN. As shown, public-safety officer 101 has an array of devices 102 and 104 to use during the officer's shift. For example, the officer may pull one radio 102 and one camera 104 for use during their shift. As shown, devices 102 and 104 may be located on a charger 103/105. Chargers 103 and 105 will have a unique charger ID that is communicated to device 102/104 through its charging port (i.e., point on a device 102/104 where they come into physical contact with chargers 103/105). In an alternate embodiment of the present invention, the charger may provide instructions for the device to unpair. For example, an unpair bit may be provided to any device on the charger. When any device 102/104 is placed in/on chargers 103/105, the devices will proceed into a charging state and the charger ID or unpair bit will be detected by the device. Once a particular device detects a certain charger ID (or detects an unpair bit), automatic unpairing of the devices from the current PAN will be triggered. The device can receive the charger ID thru any technique that conveys an ID, for example, near-field communications (NFC) or via direct charging contact/ports.

Figure 2:
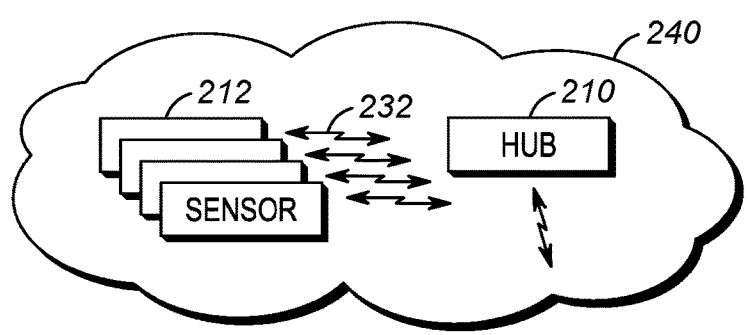
FIG. 2 depicts an example communication system.
Figure 2:

FIG. 2 depicts an example communication system 200 that incorporates PANs created as described above. System 200 includes one or more radio access networks (RANs) 202, a public-safety core network 204, hub (master device) 210, local devices (slave devices) 212, a computer 214, and communication links 218, 224, and 232. In a preferred embodiment of the present invention, hub 210 and devices 212 form a PAN 240, with communication links 232 between devices 212 and hub 210 taking place utilizing a short-range communication system protocol such as a Bluetooth communication system protocol.

Each RAN 202 includes typical RAN elements such as base stations, base station controllers (BSCs), routers, switches, and the like, arranged, connected, and programmed to provide wireless service to user equipment (e.g., hub 210, and the like) in a manner known to those of skill in the relevant art.

The public-safety core network 204 may include one or more packet-switched networks and/or one or more circuit-switched networks, and in general provides one or more public-safety agencies with any necessary computing and communication needs, transmitting any necessary public-safety-related data and communications.

The hub 210 may be any suitable computing and communication devices configured to engage in wireless communication with the RANs 202 over the air interface 230 as is known to those in the relevant art. Moreover, one or more hub 210 are further configured to engage in wired and/or wireless communication with one or more local device 212 via the communication link 232. Hub 210 will be configured to determine when to forward information via RANs 202 based on a combination of device 212 inputs.

Devices 212 and hub 210 may comprise any device capable of forming a PAN. For example, devices 212 may comprise a gun-draw sensor, a camera, a GPS receiver capable of determining a location of the user device, a clock, calendar, environmental sensors (e.g. a thermometer capable of determining an ambient temperature, humidity, presence of dispersed chemicals, radiation detector, etc.), an accelerometer, a barometer, speech recognition circuitry, a gunshot detector, . . . , etc.

Any one or more of the communication links 218, 224, 230 could include one or more wireless-communication links and/or one or more wired-communication links.

Finally, computer 214 is part of a computer-aided-dispatch center, manned by an operator providing necessary dispatch operations. For example, computer 214 typically comprises a graphical user interface that provides the dispatch operator necessary information about public-safety officers. As discussed above, much of this information originates from devices 212 providing information to hub 210, which forwards the information to RAN 202 and ultimately to computer 214.

Figure 3:
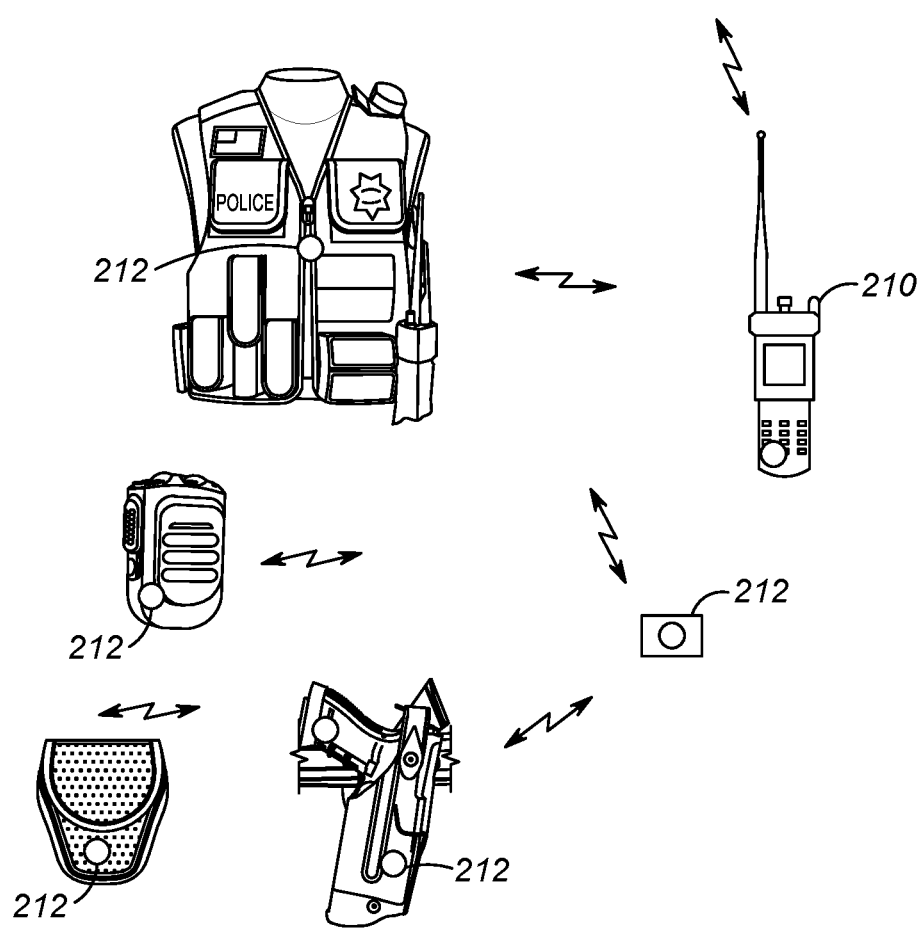
FIG. 3 depicts a more-detailed view of the personal-area network of FIG. 1.

FIG. 3 depicts a more-detailed view of the personal-area network of FIG. 2. Personal-area network comprises a very local-area network that has a range of, for example 10 feet. As shown in FIG. 3, various devices 212 are shown attached to equipment utilized by a public-safety officer. In this particular example, a bio-sensor is located within a police vest, a voice detector is located within a police microphone, a handcuff deployment sensor is located with a handcuff pouch, a gun-draw sensor is located within a holster, and a camera 212 is provided.

Devices 212 and hub 210 form a PAN 240. PAN 240 preferably comprises a Bluetooth PAN. Devices 212 and hub 210 are considered Bluetooth devices in that they operate using a Bluetooth, a short range wireless communications technology at the 2.4 GHz band, commercially available from the "Bluetooth special interest group". Devices 212 and hub 210 are connected via Bluetooth technology in an ad hoc fashion forming a PAN. Hub 210 serves as a master device while devices 212 serve as slave devices. Devices 212 notify hub 210 of a sensed condition by sending a local status alert transmitted from the sensor as a Bluetooth message. Hub 210 in turn, may forward the local status alert over a wide-area network (e.g., RAN/Core Network) to computer 214. In alternate embodiments of the present invention, hub 210 may forward the local status alert to mobile and non-mobile peers (shift supervisor, peers in the field, etc), or to the public via social media.

As discussed above, a problem exists in that forming a PAN at the beginning of a shift from the pulled devices, as well as un-forming the PAN at the end of the shift from the pulled devices can take a considerable amount time and effort for the officer. For example, a public-safety officer will need to access each device and "associate/pair" the device to the PAN at the beginning of their shift. In a similar manner, the public-safety officer will need to access each device and "disassociate/unpair" the device from the PAN at the end of their shift.

In order to address this issue, a method and apparatus for quickly disassociating/unpairing a device from a PAN is describe herein. During operation battery charger identification is utilized as a trigger to disassociate/unpair a device 210/212 from a PAN. Thus, a device will sense proximity to a charging device by detecting information transmitted from the charging device. As discussed above, this information may comprise a battery charger ID, or an unpairing bit. Once proximity to a particular charging device is detected, the device will immediately disassociate/unpair from the PAN.

Elaborating on the above, all devices within the PAN may be preconfigured to disassociate from the PAN upon the detection of a predetermined battery charger ID. Thus, in addition to charging devices 210/212, a battery charger will also be capable of causing these devices to automatically drop from any PAN they are part of. As discussed above, in an alternate embodiment of the present invention, the battery charger may instruct/command devices 210/212 to drop from any PAN by transmitting instructions to do so (e.g., a disassociate bit).

Figure 4:
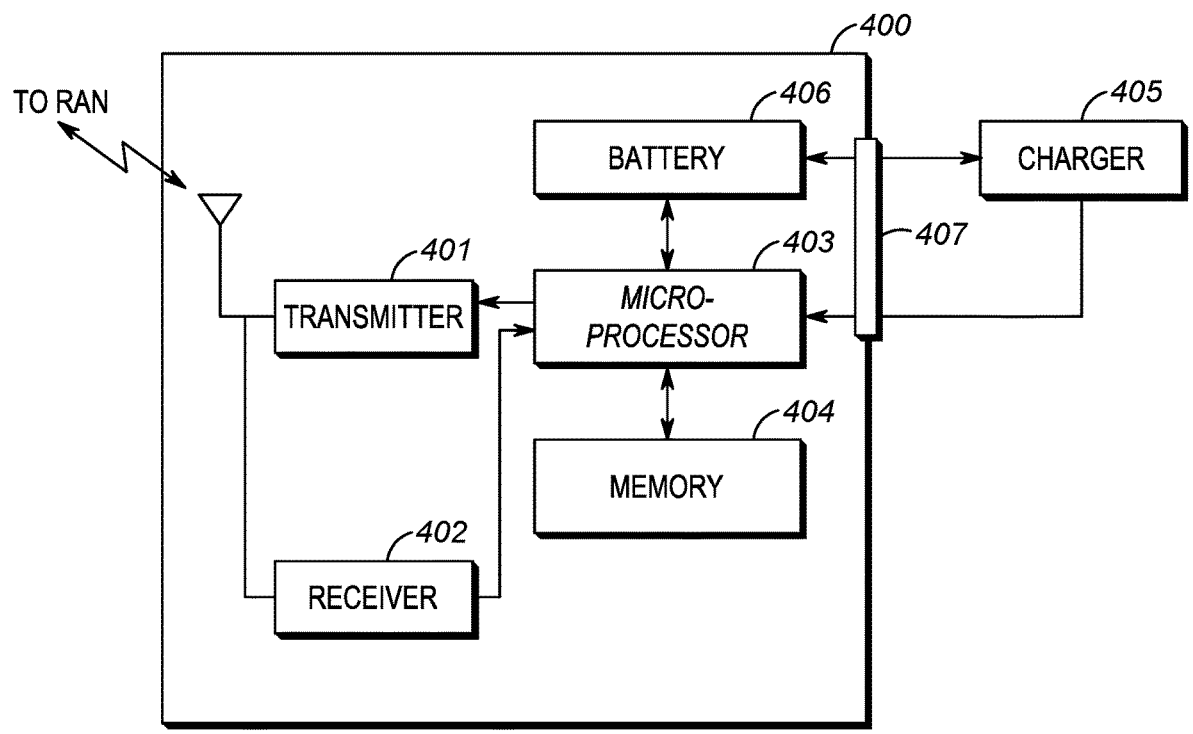
FIG. 4 is a block diagram of a PAN device of FIG. 1 and FIG. 2.

FIG. 4 is a block diagram of a PAN device 400 (e.g., hub 210 or device 212) of FIG. 1 through FIG. 3. As shown, device 400 may include transmitter 401, receiver 402, battery 406, logic circuitry 403, and memory 404. In other implementations, device 400 may include more, fewer, or different components.

Transmitter 401 and receiver 402 may be well known long-range and/or short-range transceivers that utilize any number of network system protocols. For example, transmitter 401 and receiver 402 may be configured to utilize Bluetooth communication system protocol for a body-area network, a private 802.11 network, a next-generation cellular communications protocol operated by a cellular service provider, or any public-safety protocol such as an APCO 25 network or the FirstNet broadband network. Although only a single transmitter and receiver are shown in FIG. 4, one of ordinary skill in the art will recognize that multiple transmitters and receivers may exist in device 400 to provide simultaneous communications using any number of communication system protocols.

Battery 406 provides a way of powering device 400. In a particular embodiment, battery 406 is rechargeable and recharged by placing device 400 in contact with charger 405 at port 407. Thus port 407 serves as a physical connection between battery 406 and charger 405. Port 407 can also facilitate communication between charger 405 and device 400 through their contact points. In the situation where charger 405 is a wireless charger, port 407 comprises a receiver that is both used to charge and receive data.

Charger 405 preferably comprises a device capable of generating a charging voltage and unique charger identification. In an alternate embodiment of the present invention, charger 405 may also generate an unpairing command (e.g., a bit).

It should be noted that battery 406 and charger 405 comprise standard elements that are well known in the art of charging and powering devices. For example, battery 406 can comprise a standard lithium-ion battery that is capable of direct and/or wireless charging when brought into contact/vicinity of charger 405.

Logic circuitry 403 comprises a digital signal processor (DSP), general purpose microprocessor, a programmable logic device, or application specific integrated circuit (ASIC) and is configured to detect when to unpair or disassociate with any PAN. In particular, logic circuitry 403 is configured to:

detect when device 400 is in proximity to charger 405, and disassociate from any PAN based on the proximity to charger 405; and/or detect when battery 406 is in a charging state, and detect that battery 406 is being charged by a particular charger having a particular charger ID, and disassociate from any PAN based on being in a charging state and having detected the particular charger ID; and/or detect when battery 406 is in a charging state, and detect that battery 406 is being charged by a particular charger transmitting an unpairing instruction, and disassociate from any PAN based on going from an un-charging to a charging state and the detection of the unpairing instruction.

Thus, the apparatus of FIG. 4 comprises an apparatus comprising a battery being capable of being charged by a battery charger, a port 407 coupled to the battery charger, the port 407 receiving a charger identification (ID) or an unpairing instruction from the charger, and logic circuitry coupled to the port 407, receiving the charger identification or unpairing instruction and disassociating from a network based on the unpairing instruction or based on a match between the charger ID and a predetermined charger ID.

The port 407 preferably comprises a wired or wireless battery charging port 407. The logic circuitry can also receive a battery charging state and disassociate based on the detection of the battery being in a state of charging (as opposed to not being charged). The disassociation from the network can take place when a match exists between the charger ID and the predetermined charger ID, and the battery is charging.

Figure 5:
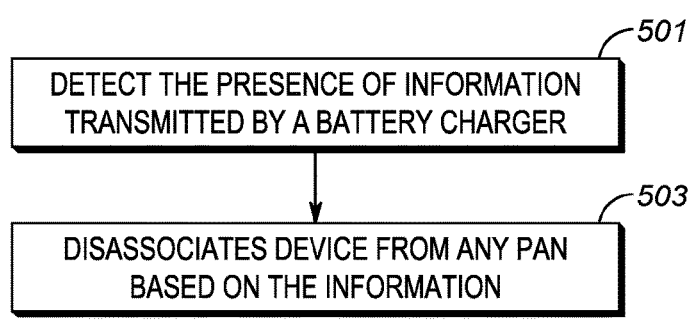
FIG. 5 is a flow chart showing operation of the PAN device of FIG. 4.

FIG. 5 is a flow chart showing operation of the device of FIG. 4. The logic flow of FIG. 5 disassociates from any PAN based upon a proximity to a predetermined charger. In a preferred embodiment of the present invention, "proximity" is determined by the detection of information transmitted by a charger, for example, an unpair instruction, or a charger identification (ID). The information can be conveyed to device 400 through a charging port 407 (point where device 400 is coupled to charger 405), or may be conveyed wirelessly through, for example a near-field wireless transmission from charger to receiver 402.

The logic flow begins at step 501 where logic circuitry 403 detects the presence of information transmitted by a battery charger, for example, a particular battery charger identification (ID) or an unpair bit. The information detected may be passed from charger 405 directly to logic circuitry 403 via a direct connection being made while charging device 400. In a second embodiment, logic circuitry 403 may receive the information via battery 406. In particular, charger 405 may pass the information to logic circuitry 403 directly, or logic circuitry 403 may have a connection to charger 405 through battery 406. Finally, the information may be provided wirelessly from charger to receiver 402, and passed to logic circuitry 403.

Regardless of how logic circuitry 403 obtains the information (e.g., the ID or unpair instruction), at step 503 logic circuitry disassociates device 400 from any PAN based on the information. For example, memory 404 may contain a plurality of IDs associated with chargers. Detection of these IDs by device 400 causes disassociation from any network. Logic circuitry checks memory 404 to determine if the particular battery charger ID matches any battery charger ID within memory 404, and if so, disassociation takes place. In an alternate embodiment of the present invention, disassociation may take place upon the detection of an unpairing bit.

It should be noted that simply detecting the battery charger ID or unpairing bit may not be enough in itself to cause a disassociation of device 400. This may be because, when the battery charger ID/unpairing instruction is transmitted wirelessly, one may not want their device 400 to disassociate when they simply walk past a particular charger. Therefore, a further step of actually being charged (being in a charging state) may be required to disassociate from any network. In other words, logic circuitry can detect battery 406 being in a charging state (being charged) and the step of disassociating being further based on the battery being in the charging state. This way, device 400 would actually need to be charging by charger 405 and have charger 405 have a predetermined ID/bit that causes disassociation from a PAN.

As described above, disassociation from a network may comprise disassociation, or unpairing from a PAN, however the above technique may apply to disassociating from any network (LAN, WAN, . . . , etc.).

Figure 6:
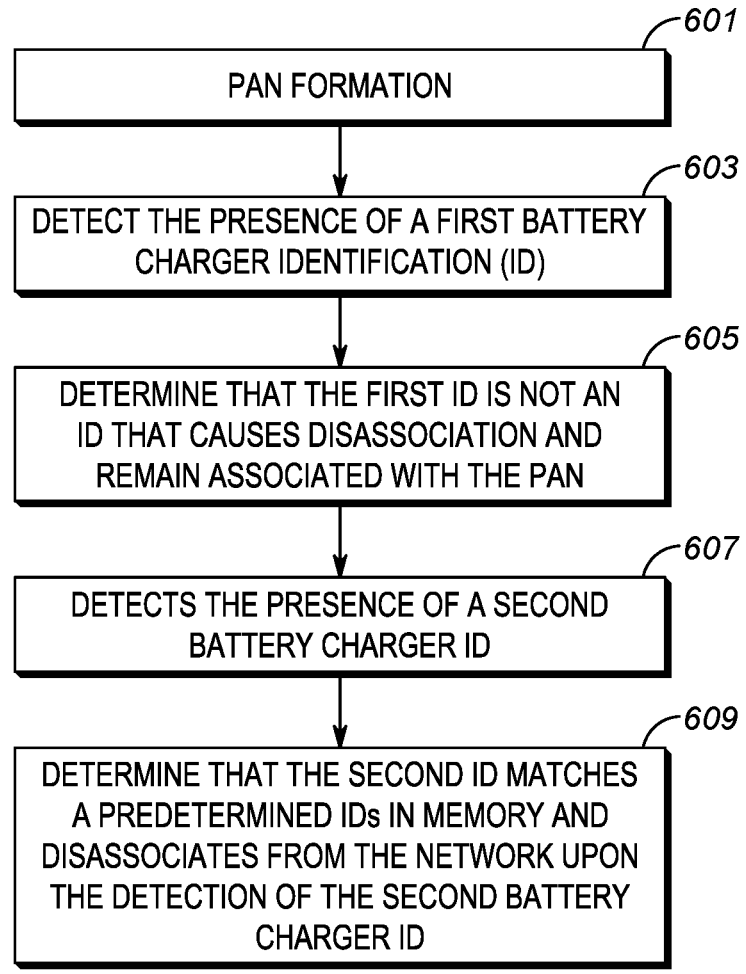
FIG. 6 is a flow chart showing operation of the PAN device of FIG. 4.

FIG. 6 flow showing operation of device 400. In particular, the steps shown in FIG. 6 (all of which are not necessary) show device 400 encountering a charger that does not cause device 400 to disassociate from any network, then, at a later time, encountering a charger that does cause device 400 to disassociate from a network. The logic flow begins at step 601 where logic circuitry 403 instructs device 400 to associate with a PAN. This is done during PAN formation, typically at the beginning of each shift. At step 603 circuitry 403 detects the presence of a first battery charger identification (ID). As discussed above, the detection of the first ID may take place via any number of ways. At step 605 device logic circuitry 403 determines that the first ID is not an ID that causes disassociation. This is determined by accessing memory 404 and determining that the first ID is not a match for any ID in memory. Thus, after step 605, device 400 remains associated with the network upon the detection of the first battery charger ID.

At a later time (step 607), logic circuitry 403 detects the presence of a second battery charger ID. Logic circuitry determines that the second ID matches a predetermined ID in memory 404, and disassociates from the network upon the detection of the second battery charger ID (step 609). It should be noted that the second battery charger ID differs from the first battery charger ID.

As discussed above, the disassociation may also be predicated upon a determination that battery 406 is being charged. Thus, if logic circuitry 403 determines battery 406 is in a charging state and a determines that a predetermined charger ID is detected, then disassociation takes place.

In the foregoing specification, specific embodiments have been described. However, one of ordinary skill in the art appreciates that various modifications and changes can be made without departing from the scope of the invention as set forth in the claims below. For example, while the above technique was described with reference to disassociating from a PAN, one of ordinary skill will recognize that disassociation from any network may be achieved as described above. For example, disassociation from a LAN may be performed as described above. Also, the "detection" of a battery charger ID may also comprise the detection of no battery charger ID. In other words, the fact that a charger does not output an ID comprises the detection of a battery charger ID equal to "no" ID. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for disassociating a device from a personal area network, the method comprising the steps of:
   detecting, by the device, information transmitted from a battery charger, wherein the information comprises a battery charger identification (ID), the battery charger not being associated with the personal area network; and
   disassociating the device from the personal area network based on the detection of the battery charger information, wherein the step of disassociating comprises the step of unpairing, wherein disassociating the device from the personal area network comprises eliminating all bonds between the personal area network and the device, wherein the unpairing from the personal area network takes place only when a particular charger ID is detected and the battery is charging.

2. The method of claim 1 further comprising the steps of:
   detecting a battery being in a charging state; and
   wherein the step of disassociating further comprises the step of disassociating based on the detection of the battery being in the charging state.

3. A method comprising the steps of:
   associating with a personal-area network (PAN);
   detecting a presence of a first battery charger identification (ID);
   remaining associated with the network upon the detection of the first battery charger ID;
   at a later time, detecting the presence of a second battery charger ID; and
   disassociating from the personal area network upon the detection of the second battery charger ID, wherein the second battery charger ID differs from the first battery charger ID, wherein disassociating from the personal area network comprises eliminating all bonds to the personal area network, wherein the battery chargers associated with the first and second battery charger identifications are not associated with the PAN.

4. The method of claim 3 further comprising the step of:
   determining that a battery is in a charging state; and
   wherein the step of disassociating takes place only when the second battery charger ID is detected, and when the battery is in the charging state.

5. The method of claim 4 wherein the step of disassociating comprises the step of unpairing.

6. An apparatus comprising:
   a battery being capable of being charged by a battery charger;
   a port coupled to the battery charger, the port receiving a charger identification (ID) from the battery charger; and
   logic circuitry coupled to the port, receiving the charger ID and disassociating from a personal area network based on match between the charger ID and a predetermined charger ID, wherein disassociating from the personal area network comprises eliminating all bonds to the personal area network, wherein the battery charger is not associated with the personal area network.

7. The apparatus of claim 6 wherein the port comprises a battery charging port.

8. The apparatus of claim 7 wherein the logic circuitry receives a battery charging state and wherein the step of disassociating further comprises the step of disassociating based on the detection of the battery being in a state of charging.

9. The apparatus of claim 8 wherein the disassociation from the personal area network takes place when a match exists between the charger ID and the predetermined charger ID, and the battery is charging.

10. The apparatus of claim 9 wherein the disassociation comprises an unpairing.

* * * * *